Nov. 26, 1935.　　　C. H. BARTON　　　2,022,071
FREEWHEELING MECHANISM FOR AUTOMOBILES
Filed Nov. 20, 1931　　　3 Sheets-Sheet 2

Inventor.
Clarence H. Barton
Attorney.

Nov. 26, 1935.   C. H. BARTON   2,022,071
FREEWHEELING MECHANISM FOR AUTOMOBILES
Filed Nov. 20, 1931   3 Sheets-Sheet 3

Inventor
Clarence H. Barton
By Arthur M<sup>c</sup>Nelson
Attorney.

Patented Nov. 26, 1935

2,022,071

UNITED STATES PATENT OFFICE 2,022,071

FREEWHEELING MECHANISM FOR AUTOMOBILES

Clarence H. Barton, Indianapolis, Ind., assignor, by mesne assignments, to William C. Starkey, Raymond S. Pruitt, and Walter H. Beal, trustees Application November 20, 1931, Serial No. 576,382

23 Claims. (Cl. 192—48)

This invention relates to improvements in free wheeling mechanisms for automobiles and it consists of the matters hereinafter described and more particularly pointed out in the appended claims.

The free wheeling mechanisms with which the invention is more particularly concerned are those which are located as a unit at the power take-off end of the transmission and such a mechanism usually has associated therewith, some means whereby the free wheeling action may be rendered inoperative or "locked-out" as it is known in the industry.

Experience has proven that it is more convenient in locking-out such a mechanism, to do so when the engine is driving the vehicle. At this time, there is no relative movement between the two coacting clutch members of the unit, but the attempt to lock the two clutch members of the unit at this time, may meet with resistance due to the fact that the spline teeth of said members are not in line. Should the operator at this time, maintain a pressure on the lock-out lever and then ease off on the accelerator for the engine, there will be a slow differential in rotative movement between said clutch members, whereby the lock-out collar can be shifted because of the lining up of the spline teeth of said members. The above is the recommended practice for locking-out free wheeling action. However, in order to meet conditions as they arise in the hands of the driving public and especially for the benefit of the unskilled or novice drivers, in emergency cases, it is desirable to lock-out the free wheeling mechanism, when the clutch pedal of the vehicle is depressed, it appearing that such a clutch pedal movement is substantially automatic with such drivers, due to habit which cannot be readily overcome.

One of the objects of the present invention is to provide a free wheeling mechanism of this kind which can be readily locked-out by the provision of means which acts to synchronize the relatively rotating clutch members of the mechanism during the movement of the associated lock-out collar, induced by the actuation of the clutch pedal of the vehicle in which said mechanism is embodied.

The above mentioned object of the invention as well as others, together with the several advantages thereof will more fully occur as I proceed with my specification.

In the drawings:—

Fig. 1a is a detail section of a portion of the manual lock-out control for the mechanism.

Fig. 4 is a transverse vertical sectional view through a part of said mechanism as taken on the line 4—4 of Fig. 2.

Figure 1:
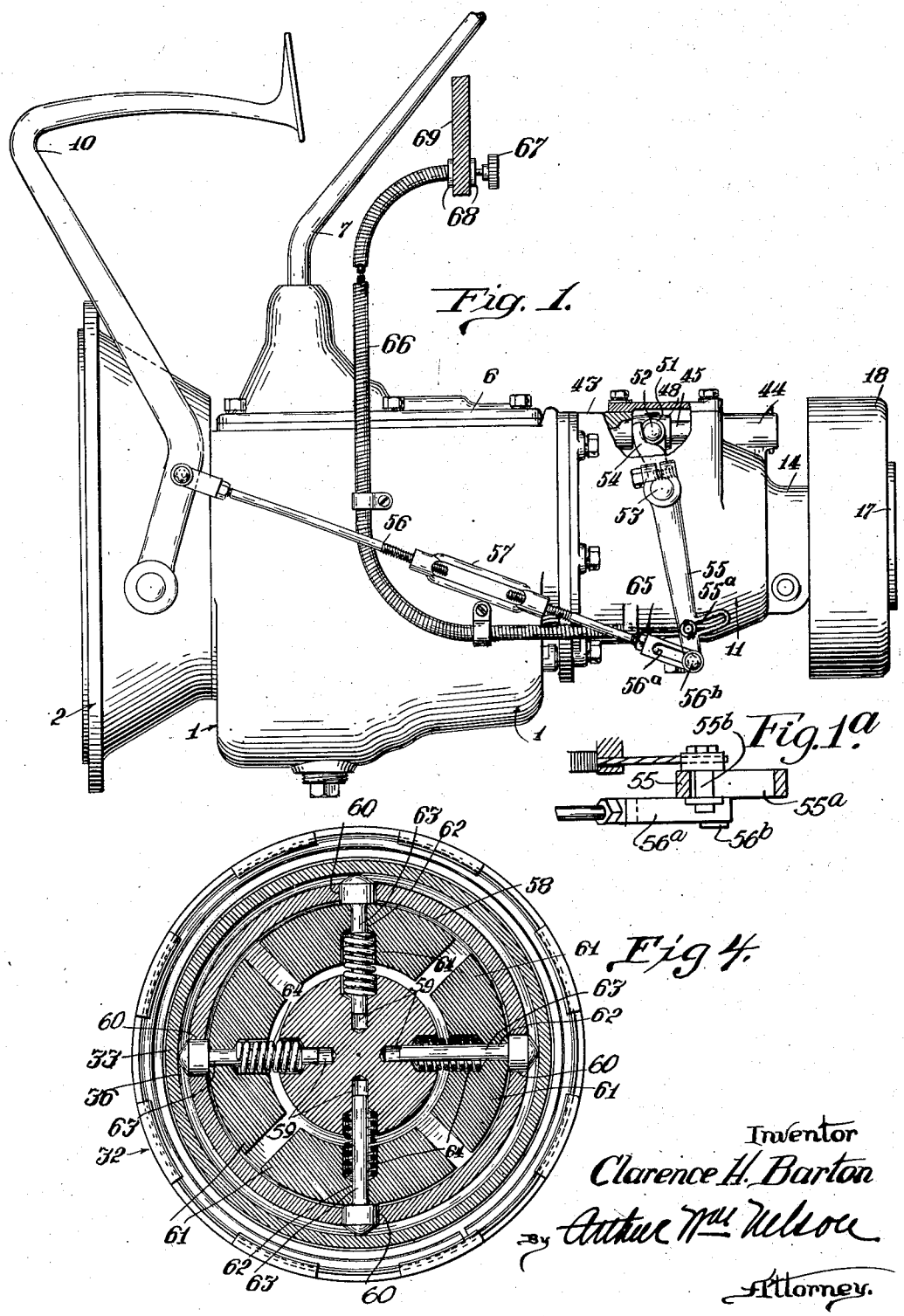
Fig. 1 is a view in side elevation of a free wheeling mechanism for automobiles, embodying my invention, as employed in connection with the transmission thereof and one of the foot pedals which is operated in driving the automobile.

The invention is especially adapted for use in connection with a free wheeling mechanism arranged at the rear end of the transmission and associated with the power take-off end of the driven shaft of said transmission.

In general, the improved mechanism includes a casing secured in any suitable manner to the rear end of the transmission and further includes a secondary driven shaft, axially arranged with the driven shaft of the transmission, and provided with means for operative connection with the propeller shaft of the automobile. The driven shaft of the transmission projects into said casing and there has secured to it a rearwardly facing cup-like clutch member, which coacts with a forwardly facing, similar clutch member on the secondary driven shaft to provide a clutch spring receiving pocket. In said pocket is located a clutch spring which in the relative rotation between said clutch members in one direction, changes its diameter to clutch said clutch members together.

Said clutch members are externally splined to receive a pair of internally splined shiftable lock-out collar members, which though relatively rotatable, are longitudinally inseparable, the adjacent ends of said collar parts being formed to provide coacting synchronizing surfaces. The lock-out collar is actuated and is shifted in one direction, into lock-out position, by means of the clutch pedal by which the transmission gearing is operatively connected to and disconnected from the engine, and is moved out of lock-out position by means of a spring.

In the shifting of the lock-out collar into lock-out position, the shifting pressure of the yoke in the initial part of its shift is yieldably resisted by means carried by the clutch member associated with said secondary driven shaft. This yielding resistance causes the synchronizing surfaces of the lock-out collar parts to engage and bring the rotative speed of said lock-out collar parts into synchronism and in the final part of the shift of the yoke, said yielding resistance is overcome so that the lock-out collar is shifted to lock-out position when both clutch members are rotating at substantially the same speed or are synchronized.

Referring now in detail to that embodiment of the invention, illustrated in the drawings:—

1 indicates as a whole, the transmission casing of an automobile, connected at its front end to the bell-shaped clutch housing 2 of the automobile. The transmission casing includes the usual shift rods 3 and 4 for the forward and reverse speed of the driven shaft 5 of said transmission. On the top of the transmission casing is a cover 6 in which is mounted in the usual manner a lever 7 by which the desired shift rod may be selectively engaged and shifted forwardly or rearwardly, to yield the desired forward speed or reverse for said driven shaft 5. Said driven shaft is journalled in antifriction bearings 8 in the rear wall 1ᵃ of the transmission casing and has a splined end 9 projecting rearwardly beyond said wall. Within the clutch housing 2 (which is operatively connected in the conventional manner with an associated engine, not shown) is the usual clutch. This clutch is actuated by a clutch pedal 10 so that the transmission may be connected to and disconnected from said engine for the purposes well-known.

Secured to the rear wall 1ᵃ of the transmission casing is the casing 11 of a free wheeling unit or mechanism and which casing 11 includes an upright rear wall 12. Said wall 12 is formed to receive an antifriction bearing 13 and includes a rearwardly extending hollow boss 14. Journalled in said bearing 13 is the midportion 15 of a secondary driven shaft and the rear end of said secondary driven shaft 15 has splined to it the hub 16 of a combined coupling member 17 and the drum 18 for the emergency brake. Secured to the shaft 15 between the bearing 13 and hub of the coupling member 17, within the boss 14 is a worm gear 19 for driving a worm 20 operatively connected to the speedometer in the manner well known.

Secured to the splined end 9 of the driven shaft 5 of the transmission rearwardly of the bearing 8 and extending into the free wheeling unit casing 11 is a rearwardly facing, cup-like clutch member 21 having external spline teeth 22. The front end of the secondary shaft 15 is made as a similar but forwardly, facing cup-like clutch member 23, having relatively short external spline teeth 24 at the front end thereof, the said clutch member abutting the clutch member 21 and the teeth 22—24 matching up with each other. The clutch member 23 includes a tubular front end extension 25 that overhangs the hub of the clutch member 21 and this last mentioned clutch member is held in place upon the splined end 9 of the shaft 5 by a nut 26.

The clutch members 21—23 coact to provide an internal clutch surface 27 for engagement by a coiled clutch spring 28 and between the front end of the extension 25 and the clutch member 21 is an antifriction bearing 29. The rear end of the clutch spring has a toed connection 30 with the clutch member 23 and associated with and operatively connected to the front end of said spring is a more sensitive energizing spring 31 having a slight frictional drag or engagement with a part of the clutch surface 27 as afforded by the clutch member 21.

In the relative rotative movement between said clutch members in one direction, the spring end 31 is picked up by the clutch member 21 and tends to rotate therewith relative to the toed end of the spring 28. This will cause the clutch spring 28 to unwind and radially expand and grip against the clutch surface 27 so as to clutch the two clutch members together. Should the clutch member 23 be rotated in said direction at a speed greater than that of the clutch member 21, then said spring 28 is wound up from its toed end and is decreased in diameter so as to release its gripping action from the clutch surface 27 so that the clutch member 23 overruns the clutch member 21 with a free wheeling action.

Means are provided for locking-out the free wheeling mechanism when the clutch pedal 10 is actuated to disconnect the transmission from the associated engine, previous to operating the shift lever 7 to provide either a forward or reverse drive for the shaft 5 of the transmission and such means are as follows:—

Figure 5:
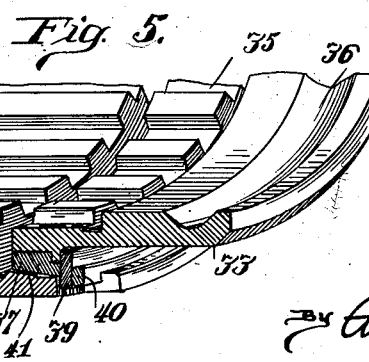
Fig. 5 is a detail sectional perspective view illustrating synchronizable parts of the lock-out mechanism and which will be more fully referred to later.

Associated with the clutch member 21—23 is a lock-out collar indicated as a whole by the numeral 32. Said collar as best shown in Fig. 5, includes a pair of relatively rotatable collar parts 33 and 34 respectively, so connected together as to be longitudinally movable in either direction without separation. The collar part 33 is provided at its front end with internal spline teeth 35 for engagement with those on the clutch member 23 and said collar part is further provided near its rear end with a V-shaped internal groove 36. On the front end of said collar part is a radial flange, overhung by a forwardly tapered ring 37 preferably of a metal, different from that of the collar part 33 and having a better frictional property or characteristic. The collar part 34 is provided with internal spline teeth 38 for engagement with the spline teeth 22 in one instance and with the teeth 22 and 24 in another instance as will later appear. The rear end of said collar part 34 is enlarged in diameter and overhangs the front end of the collar part 33 and carries an internal ring 39 for engagement behind the flange on the front end of the collar part 33 and said ring 39 is held in position by a spring ring 40 which snaps into an internal annular groove in the rear end of said collar part 34. In said rear end part of enlarged diameter of the collar part 34, is provided an internal tapered or coned surface 41 for engagement with the corresponding surface of the ring 37 before mentioned. It is apparent that with the construction of the collar 32 as before described, said collar parts while being relatively rotatable, are movable endwise without separation. In said collar part 34 about midway of its ends is an external annular groove 42 for a purpose soon to appear.

In the top part of the casing, in line with the reverse shift rod or rail 4 of the transmission are front and rear tubular bosses 43 and 44 respectively in which a rod 45 has longitudinal sliding bearing. The rear end of this rod is recessed to receive the front end of a spring 46, the rear end of said spring engaging against a stop as provided by a disc and cotter pin 47 in the rear end of the tubular boss 44. Fixed to said rod, between the bosses 43—44, is the hub 48 of a yoke 49 having diverging arms 50, the free ends of which engage in the groove 42 of the lock-out collar part 34. A stud 51 extends laterally from one side of the hub and on this stud is a roller 52. The spring 46 before mentioned is an expansion spring and normally urges the rod 45 forwardly until it is stopped by the engagement of the yoke 48 with the rear end of the boss 43.

In the left hand side wall of the casing 11 is journalled a rock shaft 53 and secured to that end of said shaft within the casing 11 is an upwardly extending arm 54 engaging the front side of the roller 52 on the yoke 49. Secured to that end of the shaft 53 outside said wall of the casing 11 is a depending arm 55. This arm is connected up to the clutch pedal 10 by a link 56 in which is provided a turn buckle 57.

In the rear face of the clutch member 23 is an annular pocket 58 and in the rear end of said clutch member are pairs of radially extending, recesses and holes 59 and 60 respectively, the recesses being disposed in the central portion of said clutch member and the holes being disposed in the outer peripheral portion of said clutch member, the recesses being of a larger diameter at the outer end. In the annular pocket 58 are located a plurality of arcuate weights 61 each including a radial opening 62 enlarged at its inner end. A pin 63 is associated with each weight and has an enlarged coned head at its outer end for engagement in an associated hole 60 and the inner end of said pin extends in guiding engagement in an associated recess 59. A spring 64 surrounds a portion of each pin 63 between the associated weight 61 and the central part of the clutch member 23 and acts to normally urge the associated weight outwardly. The coned outer end of each pin 63, is formed in accordance with and extends into the groove 36 in the lock-out collar part 33. These pins and weights normally resist a rearward movement of the lock-out collar and this resistance is increased in proportion with the speed of rotation of the clutch member 23.

In shifting from a neutral position into first speed forward and from thereon progressively into second and third speed forward and following the usual practice in shifting with conventional non-free wheeling transmissions, the clutch pedal 10 is depressed previous to the actuation of the shift lever to provide such speeds and said clutch pedal movement disconnects the transmission from the engine during the actuation of said lever. Thus with each depression of the clutch pedal, the transmission is passive with respect to the engine as it is not being driven by the engine.

In the depression of the clutch pedal, the lever 55 and arm 54 on the rock shaft are swung clockwise due to the link connection between the clutch pedal and lever 55. In this movement of the arm 54, it engages the roller 52 on the stud 51 of the hub 48 and pushes said hub and its rod 45 rearwardly. In this movement of the rod 45, the spring 46 will be put under compression and the yoke will act to impart a rearward movement to the lock-out collar member 34. If the automobile is being started from a stand still so that the clutch pedal 10 and lever 7 are being manipulated to provide first speed forward, the rearward movement imparted to the collar member 34 by the yoke, will first bring the surface 41 of said collar part 34 into engagement with the surface 37 on the collar part 33 and will push the same rearwardly. This rearward movement of the collar part 33 is resisted at this time only by the spring pressure of the pins 63 which are all depressed inwardly so that such resistance is only normal after which the collar part 34 bridges the two clutch members 21—23 to lock them together. In the acceleration of the engine during the release of the clutch pedal after the shift lever 7 has been actuated, power is transmitted from the shaft 5, through the clutch members 21—23 and collar part 34 to the secondary driven shaft, so that both clutch members are rotating together. During the release or return movement of the clutch pedal 10, the spring 46 acts through the rod 45 and yoke 49 to restore free wheeling action as is apparent.

Figure 2:
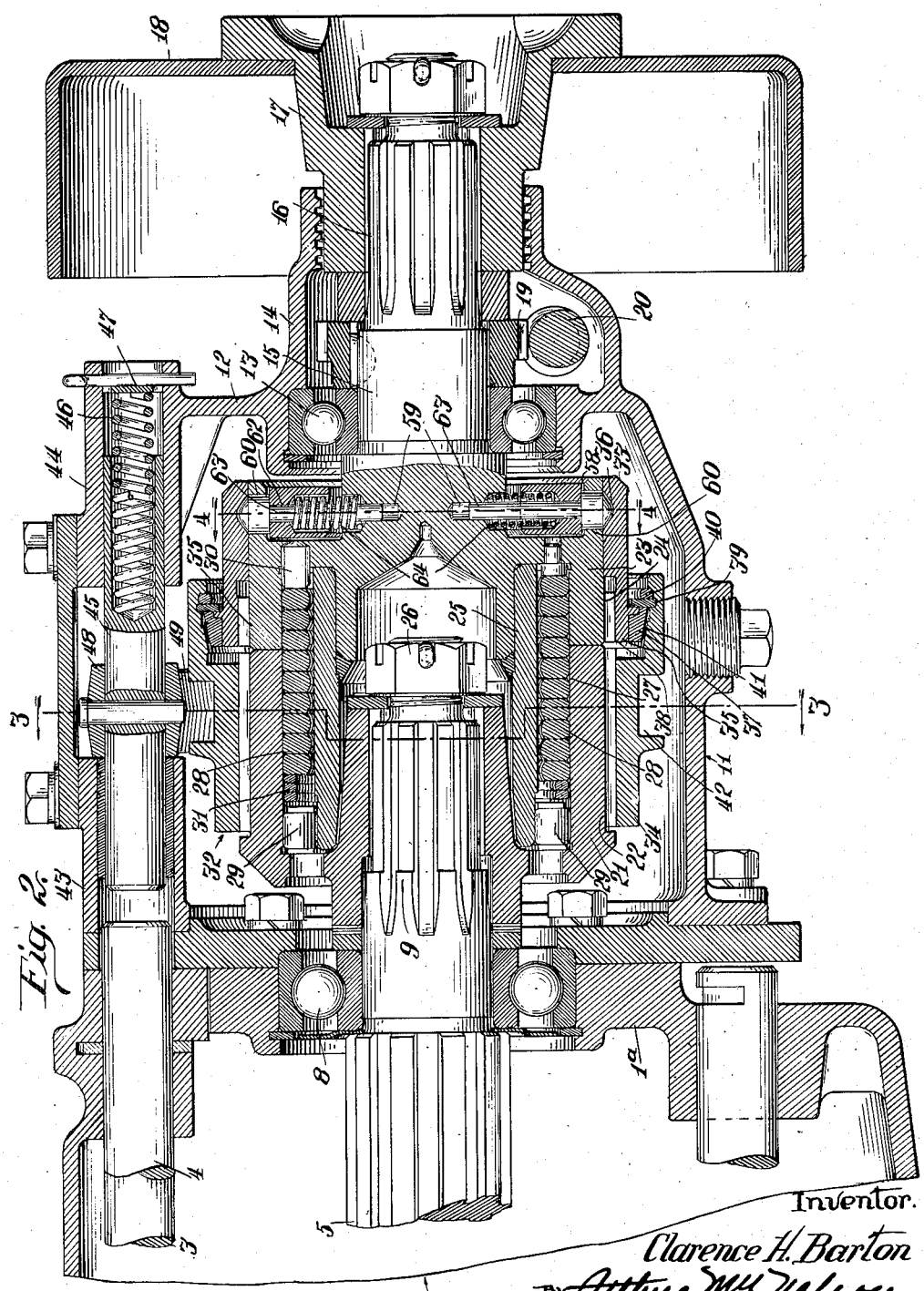
Fig. 2 is a longitudinal vertical sectional view through the improved mechanism and associated end of the transmission, on an enlarged scale, as taken on the line 2—2 of Fig. 3.
Figure 3:
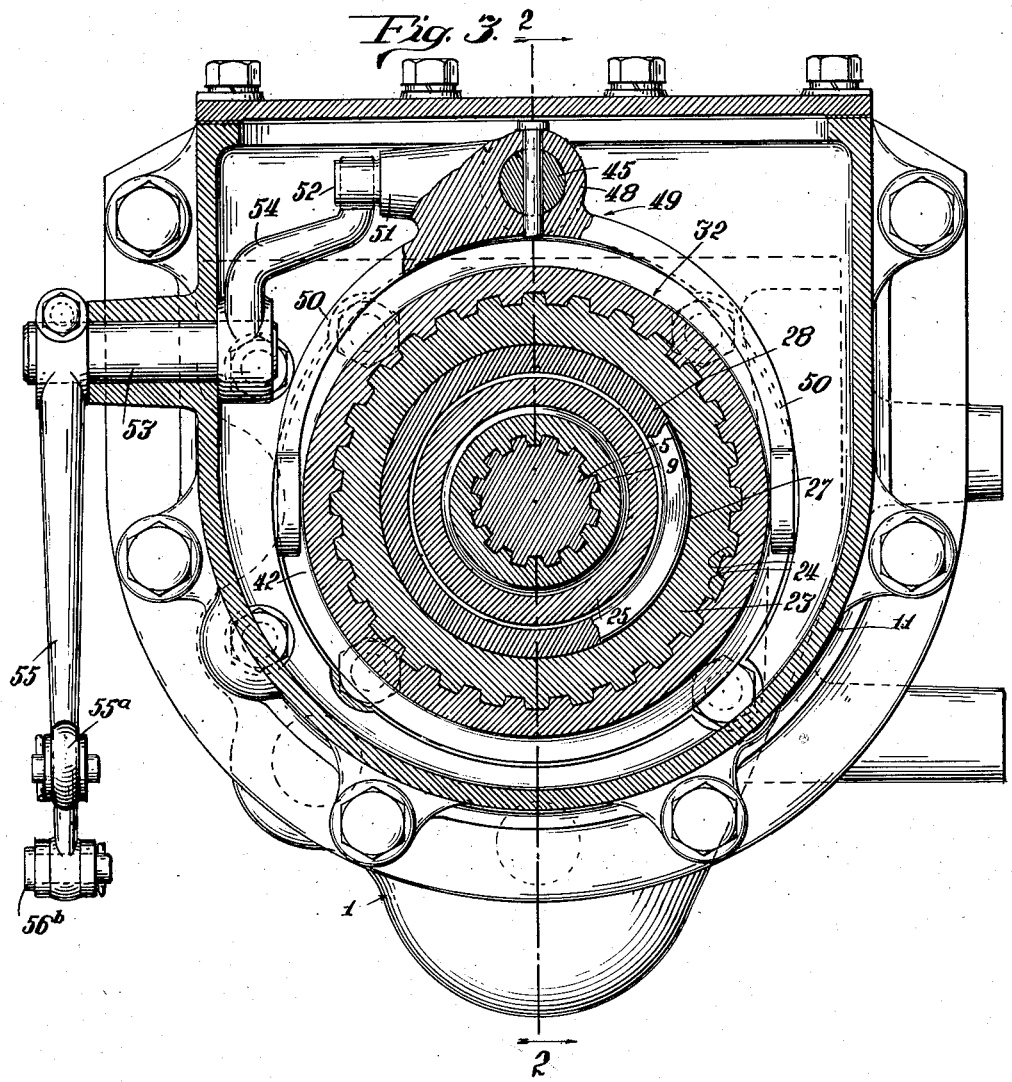
Fig. 3 is a transverse vertical sectional view through the improved free wheeling mechanism as taken on the line 3—3 of Fig. 2.

In the depression of the clutch pedal previous to shifting into second speed forward, the yoke 49 again moves rearwardly and with the automobile under way because of momentum it is apparent that the transmission is disconnected from the engine and is turning over only at a very slow speed if at all and the clutch member 23 is rotating because it is being driven through the secondary driven shaft under such automobile momentum so that it is free wheeling with respect to the clutch member 21 and the lock-out collar part 33 is rotating with respect to the collar part 34. The before mentioned rearward movement of the yoke 49 will urge the collar part 34 rearwardly. In the initial part of this movement, said collar part will move its tapered surface 41 into engagement with the associated surface 37 on the collar part 33 and will tend to push it rearwardly. As this rearward movement of the collar part 33 is being resisted by the action of the spring pressed pins 63 which action is now increased by the centrifugal action of the weights 61 acting upon said pins, it is apparent, that the collar part 34 becomes synchronized with the collar part 33 to bring the speed of the transmission up to that of the clutch member 23. In the final part of the endwise movement of the collar parts 33—34 the resistance offered by the pins 63 is overcome and they are depressed inwardly so that the two collar parts are moved rearwardly as a unit and in this final part of the movement of said collar parts, the teeth 38 of the collar part 34, bridge the teeth on the clutch members 21—23 and positively connect them together. In the acceleration of the engine during such shift, the automobile gains momentum and upon release of the clutch pedal, wherein the transmission is again connected to the engine, the clutch collar parts 33—34 are again returned to free wheeling position which is best shown in Fig. 2.

In going from second speed forward to third speed forward, the operation is the same as that above described. It is, of course, apparent that as in all conventional three speed forward and reverse transmissions, to provide reverse, the clutch pedal 10 must be depressed to disconnect the transmission from the engine after which the shift lever 7 must be manipulated to set the transmission for such reverse movement. In the depression of the clutch pedal, the collar 32 is moved rearwardly as before through the lever 55 and arm 54 acting upon the yoke 49. In this movement of the yoke, as it is fixed to the rod 45, said rod is moved rearwardly as before, thus again compressing the spring. In the manipulation of the shift lever 7 to provide reverse, the shift rod or rail 4 is moved rearwardly so that when the clutch pedal is released to return to its normal position, the collar parts are held against a return movement because of the position of the shift rod or rail 4 which prevents return movement of the rod 45. Thus the clutch members 21—23 are positively connected together so that the drive is from the shaft 5 through the clutch members 21—23 and collar part 34, to the secondary driven shaft.

When the lever 7 is manipulated to return the transmission to neutral, the shift rod or rail 4 is moved forwardly and then the spring 46 will act to expand and shift the rod 45 and yoke 49 forwardly to again return the parts to normal free wheeling position.

With the free wheeling mechanism arranged as it is in this instance, at the rear end of the transmission shaft, the transmission may be actuated to provide different speeds forward without the use of the clutch pedal, should it be so desired. Thus with the provision for shifting with or without clutch pedal operation, the shift is optional with the driver.

It is apparent that with the arrangement described, relatively small synchronizing surfaces between the collar parts 33—34 are practical because they only need have a capacity strong enough to accelerate the transmission up to the speed of the clutch member 33, and said surfaces do not have to be large enough to accelerate the engine because when the free wheeling action is locked out, the clutch pedal has been depressed to disconnect the transmission from the engine.

It is also apparent from the foregoing that when the clutch pedal is depresed to disconnect the transmission from the engine, the pressure of the collar part 33 necessary to depress the pin 63 will cause engagement of the surfaces 37 and 41 so that the transmission which is now free from the engine and is coupled to the clutch member 23 through the engagement of said surfaces, will gradually bring up the transmission to the speed of the secondary driven shaft, after which the final part of the movement of the collar 32 as a whole can be completed without a clashing of the spline teeth of the clutch members and collar.

The mechanism described locks-out the free wheeling action each time a different transmission speed is afforded through a depression and release of the clutch pedal and a shift of the transmission lever. Thus a decided factor in safety is attained because the novice driver in moments of confusion cannot so manipulate the free wheeling mechanism to clash the teeth thereof with probable disastrous results.

The arrangement described readily lends itself to the provision of a lock-out collar control, manually operable from the dash for providing a non-free wheeling transmission when so desired. To provide such a construction, the rear end of the link 56 is provided with a longitudinal slot 56ª to receive the connection 56ᵇ with the lever 55. The lever 55 is provided with an arcuate slot 55ª in which a stud 55ᵇ is slidably mounted. Manual control of the lever 55 for free wheeling lock-out purposes is effected by means of a wire 65 which is enclosed in a tubular cable 66. One end of this wire extends through the distal end of the lever 55 and is connected to the stud 55ᵇ as shown in Fig. 1a. The other end of said wire is provided with a knob or button 67 mounted in bushings 68 fixed in the dash or instrument board 69.

Should it be desired to lock-out the free wheeling mechanism, a pull on the knob or button 67 will through the wire 65, swing the lever 55 forwardly in a clockwise direction to shift the lock-out collar into lock-out position as before described. In this movement of the lever 55, the clutch pedal is in no manner affected as the connection 56ᵇ will merely move in the slot 56ª. The friction of the wire 65 in its tubular cable 66 is sufficient to hold the collar 32 in lock-out position against the action of the spring 46. Thus it is possible to operate the transmission as a conventional non-free wheeling one. After the free wheeling action has thus been locked out, a push on the knob 67 will return parts to free wheeling position. When the clutch pedal is operative to swing the lever 55 forwardly, this in no manner affects the wire 65 as its rear end will simply slide relatively to the lever 55 because of the sliding arrangement of the stud 55ᵇ in the slot 55ª; as will be apparent from Fig. 1a.

While in describing the invention, I have referred in detail to the form, arrangement and construction of the parts thereof, the same is to be considered merely as illustrative so that I do not wish to be limited thereto except as may be specifically set forth in the appended claims.

I claim as my invention:—

1. A mechanism of the kind described embodying therein, a pair of coacting clutch members and clutch means for operatively connecting them together in a relative rotation in one direction, to provide a free wheeling action therebetween, shiftable means including relatively rotatable parts for positively locking said clutch members together independent of said clutch means, and means for synchronizing the rotational speed of said relatively rotatable parts in the initial portion of the shifting of said shiftable means to so positively lock said clutch members together.

2. A mechanism of the kind described embodying therein, a pair of coaxial clutch members formed to provide a clutch spring pocket, a clutch spring in said pocket and operable in a relative rotation of the clutch members in one direction for operatively connecting them together, shiftable means for locking said clutch members together independent of said clutch spring and including a part engaged in each clutch member for synchronizing the rotational speed of the clutch members previous to the engagement of one of said parts with both clutch members to lock them together.

3. A mechanism of the kind described embodying therein, a pair of clutch members formed to provide a clutch spring pocket, a clutch spring in said pocket and operable in a relative rotation of the clutch members in one direction for operatively connecting them together, shiftable means for locking said clutch members together independent of said spring, a pedal used in operating the automobile in which said mechanism is employed, means actuated by said pedal for imparting movement to said shiftable means to connect said clutch members together independent of said clutch spring and other means arranged for operative engagement with said last mentioned means for shifting said shiftable means independent of the pedal to so positively lock said clutch members together.

4. A mechanism of the kind described embodying therein, a pair of coaxial clutch members formed to provide a clutch spring pocket, a clutch spring in said pocket and operable in a relative rotation of the clutch members in one direction for operatively connecting them together, a shiftable lock-out collar for connecting said clutch members together positively and independently of said clutch spring, a pedal used in operating the automobile in which the mechanism is employed, means for connecting said collar and pedal together so that in a part of the movement of said pedal the collar is moved to positively connect said clutch members together independent of said spring and other means for shifting said lock-out collar independent of and without affecting the position of said pedal.

5. A mechanism of the kind described embodying therein, a pair of coacting clutch members and clutch means for operatively connecting them together in a relative rotation in one direction, a pedal used in operating the automobile in which said mechanism is employed and means comprising a collar including a plurality of relatively rotatable parts actuated by said pedal for synchronizing said clutch members and then positively connecting them together independent of said clutch means.

6. A mechanism of the kind described embodying therein, a pair of coacting clutch members and clutch means for operatively connecting them together in a relative rotation in one direction, a clutch pedal used in operating the automobile in which said mechanism is employed and means comprising a collar including a plurality of relatively rotatable parts actuated by said pedal for synchronizing said clutch members and then positively connecting them together independent of said clutch means.

7. A mechanism of the kind described embodying therein, a pair of coacting clutch members and clutch means for operatively connecting them together in a relative rotation in one direction, a pedal used in operating the automobile in which the mechanism is employed, shiftable means for connecting said clutch members together independent of said clutch means, means connecting said shiftable means and pedal and operating in the depression of said pedal for first synchronizing the rotational speed of said clutch members and then positively connecting them together independent of said clutch means, means operating in the release of said pedal for actuating said shiftable means so as to release the positive connection between said clutch members and for restoring the free wheeling action of said clutch means and other means for shifting said shiftable means, independent of said pedal and without affecting its position.

8. In a mechanism of the kind described, a shaft rotatable in either direction, a second and coaxial shaft to be driven thereby, coacting clutch members on said shafts, clutch means operating in a relative rotation of said shafts in one direction for clutching said clutch members together to provide a free wheeling action, a lock-out collar including collar parts, each rotative with an associated clutch member and longitudinally shiftable to positively connect said clutch members together by locking out said clutch means and means operating in a shifting of said collar toward lock-out position for synchronizing the rotational speed of said collar parts.

9. In a mechanism of the kind described, a shaft rotatable in either direction, a second and coaxial shaft to be driven thereby, coacting clutch members on said shafts, formed to provide a clutch spring pocket on the inside of said clutch members, a spring in said pocket and operating in a relative rotation of said shafts in one direction to clutch said members together, and a lock-out collar including collar parts on the outside of said clutch members and normally rotative therewith and longitudinally shiftable to positively connect said clutch members together by locking out the action of said clutch spring, said collar parts having surfaces arranged for engagement in the shifting of said collar parts in one direction for synchronizing the rotative speed of said collar parts before they lock out the action of said clutch spring.

10. In a mechanism of the kind described, a shaft rotatable in either direction, a second shaft coaxial therewith and to be driven thereby, coacting clutch members on said shafts, clutch means for connecting said clutch members together in a relative rotation in one direction, a lock-out collar including relatively rotatable but longitudinally inseparable lock-out collar parts having engageable synchronizing surfaces, and means between one of said clutch members and associated collar parts for yieldably resisting the longitudinal shifting movement of said collar parts in one direction to cause an engagement of said synchronizing surfaces to synchronize the rotational speed of said collar parts in the initial part of the shifting movement in one direction and previous to that part of said movement which positively locks said clutch members together.

11. In a mechanism of the kind described, a shaft rotatable in either direction, a second shaft coaxial therewith and to be driven thereby, coacting clutch members on said shafts, clutch means for connecting said clutch members together in a relative rotation in one direction, a lock-out collar including relatively rotatable but longitudinally inseparable lock-out collar parts having engageable synchronizing surfaces, and means between said clutch member on the second shaft and the associated collar for increasing the resistance to such a shifting movement of said collar in accordance with the increase of the speed of said second shaft.

12. In combination with two axially disposed clutch members coacting to provide a clutch spring pocket, a clutch spring in said pocket and operating in a relative rotation in one direction to clutch said clutch members together, a two-part lock-out collar normally surrounding said clutch members and having a splined connection therewith, said collar parts being relatively rotatable but being longitudinally movable together and having portions formed to provide synchronizing surfaces, said collar parts being shiftable in one direction to positively connect said clutch members together independent of said spring, and means carried by one of said clutch members and having portions engaging its associated clutch collar part and yieldably resisting the longitudinal shifting of said collar parts into lock-out position, to cause engagement of said surfaces and the synchronization of said collar parts and clutch members in the initial part of the movement of said collar parts toward lock-out position.

13. In combination with two axially disposed clutch members, coacting to provide a clutch spring pocket, a clutch spring in said pocket and operating in a relative rotation in one direction to clutch said clutch members together, a two-part lock-out collar normally surrounding said clutch members and having a splined connection therewith, said collar parts being relatively rotatable but being longitudinally movable together and having portions formed to provide synchronizing surfaces, said collar parts being shiftable in one direction to positively connect said clutch members together independent of said spring, and spring pressed and centrifugally actuated means carried by one of said clutch members and including parts engaging the collar part associated with said one of said clutch members for yieldably resisting the longitudinal shifting of said collar parts into lock-out position to cause engagement of said surfaces and the synchronization of said collar parts and clutch members in the initial part of the movement of said collar parts toward lock-out position.

14. In combination with a casing enclosing an automotive clutch and including an operating pedal therefor, a transmission including a shift lever and a driven shaft, a free wheeling mechanism associated with said shaft of the transmission and driven thereby and including coacting clutch members and a clutch means for operatively connecting them together in a relative rotation in one direction, shiftable means including relatively rotatable parts associated with said clutch members for positively connecting the clutch members together and thus locking out said clutch means and means operating in the actuation of said pedal for shifting said parts of said shiftable means for positively connecting said clutch members together, said parts of said shiftable means including means for synchronizing them previous to positively connecting said clutch members.

15. In combination with a casing enclosing an automotive clutch and including an operating pedal, a transmission including a driven shaft and a lever for selectively providing forward speeds and reverse for said shaft, a free wheeling mechanism associated with said shaft of said transmission and driven thereby and including coacting clutch members and a clutch means for operatively connecting them together in a relative rotation in one direction, shiftable but relatively rotatable collars associated with said clutch members for positively connecting them together and thus locking out said clutch means, means operating in the depression of said pedal for moving said shiftable collars first into a position synchronizing them and then into lock-out position in providing either a forward or reverse drive for the transmission, and means for shifting said shiftable collars out of lock-out position in going into neutral for said transmission.

16. In combination with a casing enclosing an automotive clutch and including an operating pedal, a transmission including a driven shaft and a lever for selectively providing forward speeds and reverse for said shaft, a free wheeling mechanism associated with said shaft of said transmission and driven thereby and including coacting clutch members and a clutch means for operatively connecting them together in a relative rotation in one direction, shiftable collars associated with said clutch members for positively connecting them together and thus locking out said clutch means, means operating in the depression of said pedal for moving said shiftable collars to lock-out position in providing either a forward or reverse drive for the transmission, means operating in the release of said pedal in any of the forward speeds of the transmission for moving said shiftable collars out of lock-out position, and means actuated by the lever when set to provide reverse for the transmission for preventing said means operated in the release of the pedal from moving said collars out of lockout position.

17. A mechanism of the kind described embodying therein a pair of coacting clutch members and a clutch means for operatively connecting them together in a relative rotation in one direction to provide a free wheeling action therebetween, means for locking out said action comprising relatively rotatable parts that are shiftable together longitudinally, means for shifting said parts into a position positively locking said clutch members together, and means operating in the initial part of said shift for offering a yielding resistance thereto so as to bring said parts into engagement for synchronizing them previous to the final part of said shift.

18. A mechanism of the kind described embodying therein a pair of coacting clutch members and a clutch means for operatively connecting them together in a relative rotation in one direction to provide a free wheeling action therebetween, means for locking out said action comprising relatively rotatable parts that are shiftable together longitudinally, means for shifting said parts into a position positively locking said clutch members together, and means arranged radially of one of the clutch members for offering a yielding resistance to said shift of said parts so as to bring them into synchronizing engagement previous to the final part of the shift.

19. A mechanism of the kind described embodying therein a pair of coacting clutch members and a clutch means for operatively connecting them together in a relative rotation in one direction to provide a free wheeling action therebetween, means for locking out said action comprising relatively rotatable parts that are shiftable together longitudinally, means for shifting said parts into a position positively locking said clutch members together, and means arranged radially of one of the clutch members for offering a yielding resistance to said shift of said parts so as to bring them into synchronizing engagement previous to the final part of the shift, said last mentioned means being so formed as to increase said resistance in proportion with the rotative speed of the associated clutch member.

20. A mechanism of the kind described embodying therein, a pair of coacting clutch members, and clutch means for operatively connecting them together in a relative rotation in one direction to provide a free wheeling action therebetween, shiftable means for positively locking said clutch members together independent of said clutch means, a rockable lever, means for translating the rocking movement of said lever into a shifting movement of the shiftable means, a pedal used in operating the automobile in which the mechanism is employed, means connecting said pedal and lever for imparting a rocking movement thereto for shifting said shiftable means to positively lock said clutch members together, and other means independent of said pedal operatively engaged with said lever for rocking the same for shifting said shiftable means to lock said clutch members together.

21. A mechanism of the kind described embodying therein, a pair of coacting clutch members and clutch means for operatively connecting the members together in a relative rotation in one direction to provide a free wheeling action therebetween, shiftable means for positively locking said clutch members together independent of said clutch means, a rocking lever, means for translating the rocking movement of said lever into a shifting movement of the shiftable means, a pedal used in operating the automobile in which the mechanism is employed, a link operatively connected to said pedal, other means also connected to said lever, said link and said other means each having a lost motion connection with said lever, whereby said lever may be rocked either through the pedal without affecting said other means or through said other means without affecting the pedal.

22. The combination of a driving member and a driven member, clutch bodies each drivingly connected to an associated member, peripheral teeth on said clutch bodies, clutch means engageable with both of said clutch bodies for establishing a one way drive between said bodies, a sleeve comprising relatively rotatable parts that are axially movable together as a unit, internal teeth on said sleeve parts normally engaged with those on said clutch bodies, said sleeve parts when moved axially, engaging the internal teeth of one of said parts with the peripheral teeth on both of said clutch bodies to establish a two-way drive between said bodies, and means associated with said sleeve parts and operating in the initial portion of the axial movement thereof in one direction for synchronizing said sleeve parts prior to connecting said clutch bodies together for the two way drive between them.

23. A mechanism of the kind described embodying therein a pair of coacting clutch members and clutch means for operatively connecting the members together in a relative rotation in one direction, shiftable means for positively locking said clutch members together independently of the clutch means, a clutch pedal used in operating the automobile in which said mechanism is employed, means connecting the clutch pedal to the shiftable means and operable in the depression of said pedal to shift said shiftable means into its operative position, a wire for manually shifting said shiftable means into and out of its operative position and a connection between the wire and said shiftable means whereby the wire is operable to shift the shiftable means into its operative position independently of and without affecting the position of the pedal.

CLARENCE H. BARTON.